G. G. NOTT.
Colter.
No. 233,793.  Patented Oct. 26, 1880.
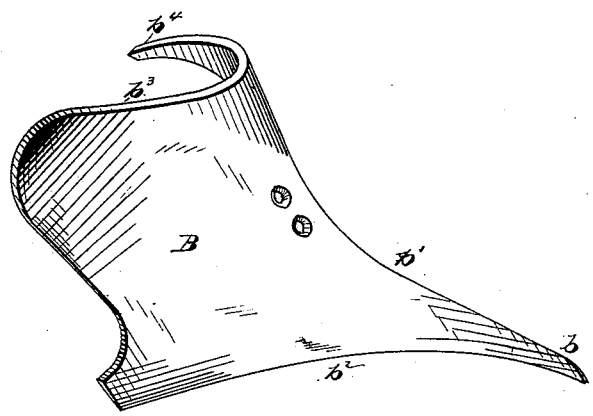
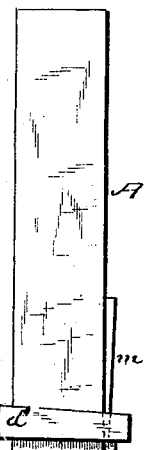
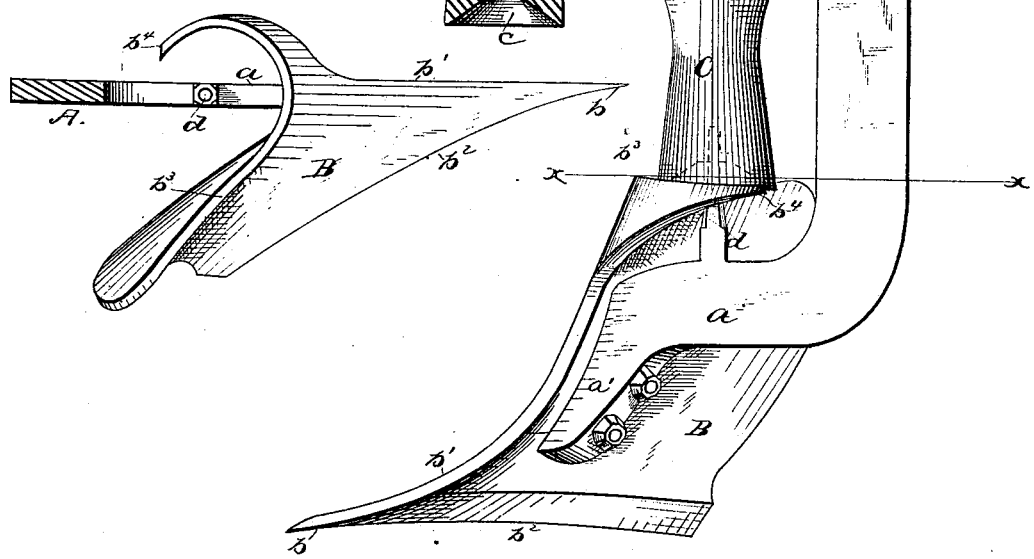
Attest,
W. H. N. Knight
W. Blackstock
Inventor.
Gardner G. Nott.

UNITED STATES PATENT OFFICE.

GARDNER G. NOTT, OF WEST POINT, WISCONSIN.

COLTER.

SPECIFICATION forming part of Letters Patent No. 233,793, dated October 26, 1880.

Application filed January 23, 1880.

*To all whom it may concern:*

Be it known that I, GARDNER G. NOTT, of West Point, Columbia county, Wisconsin, have invented a certain new and Improved Plow-Colter; and I do hereby declare the following to be a full and exact description of the same, reference being had to the accompanying drawings, forming part of this specification, in which—

Figure 1 is a side elevation; Fig. 2, a horizontal section in line $x$ $x$, the roller being removed; Fig. 3, a vertical section of the roller, and Fig. 4 is a perspective view of the mold-board.

Similar letters of reference in the several figures denote the same parts.

This invention relates to that class of plow-colters in which a cutting and deflecting point or mold-board is combined with a roller arranged on a vertical axis behind said mold-board; and the invention consists in a certain improved construction and arrangement of parts, which I will now proceed to describe.

In the drawings, A represents the bar by which the colter is attached to the plow-beam by any of the usual means. The upper portion of the bar is preferably straight and vertical. The lower end bends nearly horizontally forward at $a$ and terminates in a flange, $a'$, provided with rivet-holes and a suitable oblique face by which to secure the cutting and deflecting point or mold-board B to the said bar. The mold-board is preferably in the form shown in Fig. 4, having a penetrating-point, $b$, a cutting front edge, $b'$, a cutting lower edge, $b^2$, and a nearly horizontal upper edge, $b^3$, and, whatever its shape in other respects, it is essential that its upper edge on the landside be formed into a tapering point, $b^4$, and be curved around so as to encompass and guard the roller and pivot on said side of the colter, the upper edge and furrow wing of the mold-board serving to guard said roller and pivot in front and on the furrow side thereof.

The point $b^4$, it will be observed, tapers upward and backward, so that its lower edge forms an easy incline to ride over the dirt, while its upper edge is nearly or quite horizontal.

The mold-board and neck $a$ of the supporting-bar are so constructed and arranged as to bring the upper edge of the mold-board and the backward projecting point $b^4$ at a considerable distance above the upper edge of the part $a$.

The roller C is made with a concave lower end, $c$, and is mounted on a vertical spur or pivot, $d$, extending upward from the part $a$ in such manner as to bring the lower edge of the roller behind the top of the mold-board and within the bent arm or point $b^4$ and leave a free open space all around said pivot below the arm $b^4$, behind the mold-board, and above the part $a$, as shown, in order that dirt may not lodge around said pivot or under the roller.

$d'$ represents an adjustable arm provided with a slot, through which the bar A passes. The arm $d'$ is provided with a recess on its outer end, which is made to receive the reduced end of a metallic shaft, $e$, passing through the center of the roller $c$. The lower end of the shaft $e$ is provided with a recess, $n$, for the reception of the vertical pin $d$. The slot in the arm $d'$ is made slightly longer than the width of the bar A, so that the arm may be adjusted on the bar to allow for wear of the pin $d$, and by this construction the roller can be readily removed or replaced.

The object in making the lower end of the roller concave is to cover and protect the bearing-point of the pivot, so that dirt, sand, &c., may not work in between the bearing-surfaces. In this respect the concave form of the end of the roller co-operates with the protecting edge of the mold-board and bent arm $b^4$, all said parts contributing to the result desired and relieving and supplementing each other in the performance of their joint duty.

The upper end of the roller is supported in the usual manner. The roller is preferably concave on its sides, as shown in Fig. 1; but this portion of its concavity is not claimed as new.

The colter thus constructed, when combined with a plow, operates to sever the sod or surface of dirt and to lay or push the grass or stubble over to the right, so that the turning of the furrow-slice immediately afterward by the mold-board of the plow brings the whole of the grass or stubble neatly under said slice, enabling the plow to cover the grass or stubble completely, thus not only making neater work, but preventing any loss of the enriching qualities of said vegetable growths. The force required to impel the colter through the ground does not increase the labor of the team, inasmuch as it relieves the plow to a corresponding extent.

The chief advantage of my improvement is that the complete protection of the roller from choking or clogging at its lower end enables it to turn readily at all times, while the form of the curved arm $b^4$ not only contributes to said result, but enables the mold-board to pass through the dirt and by obstructions more easily than would otherwise be the case. The roller C must be made solid, or at least with imperforate surface, in order to prevent grass, stubble, pebbles, &c., from sticking in it and obstructing its operation.

I am aware of the patents to A. P. Webber and G. B. Vaughan, showing clearing-rollers; but neither of them shows a roller having a concave base to protect the pivot from dirt, nor an adjustable upper bearing to compensate for wear, both of which features I regard as of great importance.

Having thus described my invention, I claim as new—

In a plow-colter, the combination of the supporting-bar A, having the spur $d$ on its bent lower end and terminating in the flange $a'$, provided with an oblique face and rivet-holes, of the mold-board B, having a nearly horizontal upper edge, $b^3$, terminating in a curved arm, $b^4$, encircling and lying above the lower end of the roller, roller $c$, having a cavity in its lower end, roller-shaft $e$, having the recess $n$, slotted adjustable arm $d'$, having a socket or bearing at its outer end, and key $m$, the whole constructed, arranged, and operated in the manner and for the purpose set forth.

GARDNER G. NOTT.

Witnesses:
THOMAS J. CLEMANS,
S. H. WATSON,
J. O. EATON.